Patented Aug. 11, 1953

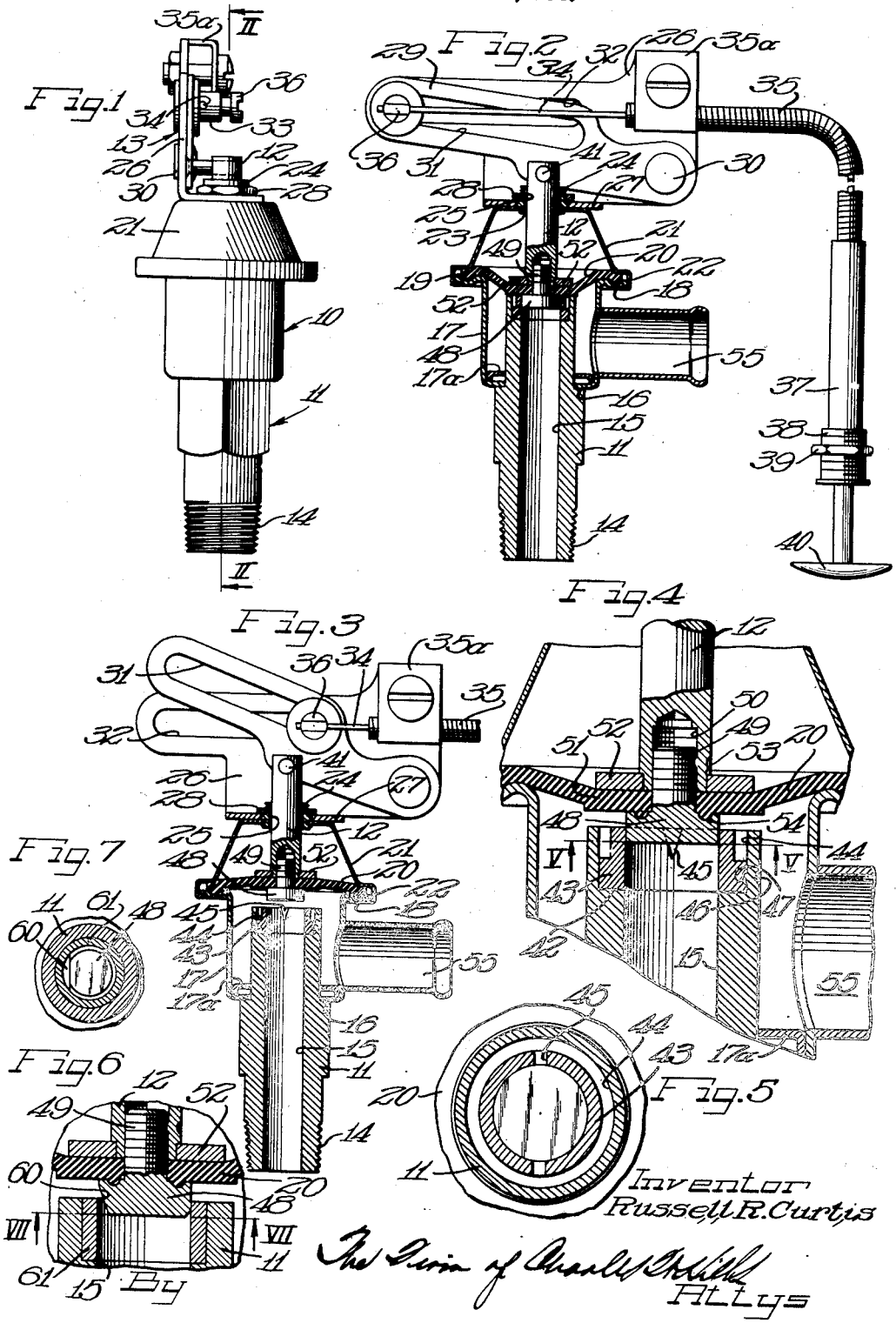

2,648,518

UNITED STATES PATENT OFFICE 2,648,518

REMOTE CONTROL METERING VALVE

Russell R. Curtis, Bedford, Ind., assignor to Curtis Automotive Devices, Inc., Bedford, Ind., a corporation of Ohio Application October 17, 1949, Serial No. 121,807

7 Claims. (Cl. 251—24)

The present invention relates to a remote control valve and more particularly to a valve in which fluid flow is diverted through an auxiliary discharge chamber when the valve is partially opened and through the valve body proper when the valve is fully opened to provide a valve construction having a large flow capacity while being capable of minute adjustment when partially opened.

The remote control valve of the instant invention is particularly adapted for use in an automotive-type hot water heater to regulate the flow of hot water into the heater. This application is a continuation-in-part of the pending application of Russell R. Curtis and Ewald J. Kimm entitled "Remote Control Valve," Serial No. 87,534, filed in the United States Patent Office on April 14, 1949.

As disclosed in the earlier filed application, it is desirable to employ a remote control valve for an automobile hot water heater to control the flow of hot water from the cooling system of the automobile engine to the heater and thereby to control the amount of heat input into air discharged from the heater. In the valve of the present invention, opening and closing movement of the valve closure means is controlled by means of a simple pivoted linkage arrangement and a manually operable control cable as disclosed in the earlier filed application.

The valve of the present invention is provided with an improved valve closure means and bypass arrangement which makes possible the accurate control of fluid flow through the valve at all flow values within the entire range accommodated by the valve. More specifically, the valve body, through which fluid flow is directed to the heater, is provided with an internal shoulder adjacent the outlet mouth of the valve body, and a bushing having an internal bore registering with that of the valve body is bottomed upon the shoulder. The bushing is provided with a peripheral groove cooperating with adjacent portions of the valve body to form an annular bypass discharge chamber communicating with the discharge nipple of the valve. Communication between the flow passage of the valve body and the annular bypass discharge chamber is provided by apertures extending radially through the bushing. The bushing apertures decrease in size axially inwardly of the bushing in order to provide varying size orifices as will be later explained.

The valve closure means include a valve stem controlled by the pivotal control linkage and having a flexible diaphragm secured to one end thereof, the diaphragm being capable of movement axially of the valve body to close the discharge end of the valve body upon appropriate movement of the control linkage. The diaphragm carries a valve piston located centrally thereof and of such size as to snugly fit within the bore of the bushing seated upon the valve body shoulder. Inasmuch as the valve piston projects beyond the diaphragm and extends into the bushing when the valve is closed, the valve piston provides means for controlling the size of the communicating aperture between the bushing bore and the annular bypass chamber thereabout.

Upon actuation of the control linkage to open the valve, the diaphragm is moved away from its seated position overlying the discharge end of the valve body and upon continued movement of the diaphragm, the piston will be withdrawn from the bore of the bushing. However, when the control linkage is actuated only to such an extent that the diaphragm is removed from its seated position upon the valve body and the piston is only partially withdrawn from the bushing bore, flow may occur through the radial bushing apertures into the bypass chamber and then into the discharge nipple of the valve. Thus it is possible to control partial discharge of fluid from the valve, with the extent of flow being determined by the extent to which the valve piston is withdrawn from its fully extended position within the bushing.

In an alternative form of the invention, the apertured bushing may be replaced by a simple cylindrical bushing collar, and one side of the cylindrical piston may be beveled or flattened radially inwardly toward the lower end thereof. Upon withdrawal of the beveled piston from the bushing an increasing flow of fluid occurs through the increasingly sized orifice thus provided.

It is, therefore, an important object of the present invention to provide an improved type of fluid flow valve capable of minute adjustment to a partially opened position in which controlled quantities of fluid are discharged therefrom.

Another important object of the present invention is to provide a control valve for an automotive-type hot water heater in which the amount of water introduced into the heater is accurately controlled by means of a bypass discharge chamber and a cooperating diaphragm and valve piston arrangement.

It is a further important object of the present invention to provide a valve in which fluid discharge, when the valve is partially opened, is controlled by means of a valve piston slidably entered in the discharge opening of a valve body to control fluid discharge therefrom.

Still another important object of the present invention is to provide an improved remote control valve in which a diaphragm and a valve piston projecting therebeyond are actuated by means of a control cable and a pivoted linkage to divert fluid flow from the valve through an auxiliary discharge chamber when the valve is partially opened and through the valve body proper when the valve is fully opened.

Other and further important objects of this invention will be apparent from the disclosures in the specification and the accompanying drawings.

On the drawings:

Figure 1 is a front elevational view of a valve of the present invention;

Figure 2 is a sectional view, with parts shown in elevation, taken along the plane II—II of Figure 1, showing the valve in closed position;

Figure 3 is a view similar to Figure 2 showing the valve in full open position;

Figure 4 is a greatly enlarged, fragmentary sectional view, similar to Figures 2 and 3, illustrating the valve in partially opened position;

Figure 5 is an enlarged sectional view taken along the plane V—V of Figure 4;

Figure 6 is a fragmentary sectional view, similar to Fig. 4 illustrating a modified form of the invention; and Figure 7 is a sectional view taken along the plane VII—VII of Fig. 6.

As shown on the drawings:

In Figure 1, reference numeral 10 refers generally to a valve of the present invention including a valve body 11 adapted for the flow of fluid therethrough, a valve stem 12 for actuating the flow controlling elements of the valve 10, and a control linkage assembly 13 for actuating the valve stem 12.

The valve body 11 is provided with exterior threads 14 for securing the valve to the engine block of an automotive-type engine in flow communication with a coolant medium circulated through the block. The valve body 11 is axially apertured as, at 15, to accommodate fluid flow through the body.

The valve body 11 is provided with an external annular shoulder 16 intermediate its length for receiving a discharge cup 17, the cup 17 being seated on the shoulder 16 and secured thereto by suitable means, as by silver or copper brazing. An annular collar 17a is secured to the body 11 inside the cup 17 and contacts the inner surface of the bottom wall of the cup 17 to urge the cup against the shoulder 16. The cup 17 is provided with a radially outwardly extending annular shoulder 18, extending axially beyond the body 11, to receive the outer peripheral lip 19 of a flow control diaphragm 20 extending radially across the cup 17 in a position overlying the bore 15 of the valve body 11. The cup 17 also carries a radially extending side discharge nipple 55 communicating with the cup intermediate shoulder 18 and collar 17a.

The diaphragm 20 is secured in position on the shoulder 18 by means of an upwardly dished cap 21 having a downwardly and outwardly extending peripheral flange 22 surrounding its lower enlarged mouth. The flange 22 contacts the upper surface of the periphery 19 of the diaphragm 20 and the terminal edge of the flange 22 is rolled under the flange 18 to secure the cap 21 to the cup 17 with the diaphragm 20 peripherally clamped therebetween.

The upper smaller end of the cap 21 is centrally apertured as at 23 to receive an exteriorly threaded bushing 24 having an axial bore 25 loosely guiding the valve stem 12.

A control linkage bracket 26 is provided with a lower mounting flange 27 fitted over the bushing 26 and secured thereto in position abutting the cap 21 by a lock nut 28. The control bracket 26 carries a lever 29 secured thereto by means of a pivot pin or rivet 30, the lever 29 having an elongated slot 31 formed therein. The bracket 26 is provided with a similar slot 32 complementary to the slot 31, and a slide pin 33 extends through the corresponding slots 31 and 32, so that pivoting movement of the lever 29 about the pivot pin 30 is effected by longitudinal sliding movement of the slide pin 33 within the slots 31 and 32.

Movement of the pin 33 is controlled by means of a conventional control cable 34 and cable housing 35 (preferably of the Bowden type), the end of the cable 34 being secured to the pin 33 by means of a lock screw 36. A cable housing bracket 35a secures the end of the housing 35 to the control bracket 26. The remote end of the control cable 34 and the housing 35 passes through a cylindrical sleeve 37 having a threaded end portion 38 and a lock nut 39 for securing the sleeve in a desired position, as on an automobile dash. A push-pull handle 40 is provided for actuating the cable 34.

The valve stem 12 is pivoted to the lever 29 by means of pivot pin 41 and it will be seen that longitudinal movement of the push-pull handle 40 will cause a corresponding longitudinal movement of the control cable 34 and of the pin 33 within the slots 31 and 32 to cause pivoting of the lever 29 about the pin 30 and vertical movement of the valve stem 12 and the diaphragm 20, the direction of movement of the diaphragm being axially of the valve body 11.

The means for accurately controlling the flow of fluid through the valve when the valve is partially opened are particularly illustrated in Figure 4 of the drawings and include an internal annular shoulder 42 formed by a counterbore in the bore 15. A generally cylindrical bushing 43 is seated on the shoulder 42, the bushing being provided with an outer circumferential annular recess 44 terminating short of the shoulder 42. A pair of V-shaped ports or apertures 45 are formed inwardly of the bushing 43, the apertures 45 decreasing in width axially inwardly of the bushing, and being of substantially the same depth as the recess 44. The bushing 43 is secured in seated position upon the shoulder 42 by means of radially inwardly extending staked or deformed portions 46 in the sleeve 11 causing a corresponding deformation 47 of the sleeve. The groove 44 together with the encircling terminal portion of the valve body 11 forms an annular auxiliary discharge chamber communicating with the bore 15 of the body 11 through the notches or apertures 45.

The diaphragm 20 is secured to the valve stem 12 by means of a piston 48 having a threaded cylindrical terminal portion 49 threaded into a complementary recess 50 formed in the lower end of the valve stem 12. A central thickened portion 51 of the diaphragm 20 is backed by a washer 52 seated against an external shoulder 53 formed in the valve stem 12, the diaphragm portion 51 being urged against the washer 52 by means of the cylindrical head portion of the piston 48 bearing against the opposing side of the diaphragm. The piston head 48 is formed with an upper annular channel 54 receiving a complementary portion of the diaphragm 20 to prevent undesired lateral movement of the diaphragm relative to the piston head. The valve piston 48 has a smooth outer periphery of such size as to fit snugly inside the bore of the bushing 43.

When the valve is in the position shown in Figure 2, the valve stem 12 is depressed, maintaining the diaphragm 20 tightly against the adjacent end of the valve body 11 to close both the end of valve body bore 15 and the annular discharge chamber 44, and the valve piston 48 is inserted in the body bore 15 to close the auxiliary discharge ports 45. Upon lateral movement of the cable 34 to shorten that portion of the cable exposed beyond the housing 35, the lever 29 will be pivoted about the pin 30 to elevate the valve stem 12 and eventually to move the valve to full open position as shown in Figure 3, at which position unobstructed flow of fluid from the bore 15 into the discharge cup 17 and through the discharge nipple 55 is possible.

When the valve piston 12 is only partially elevated, as shown in Figure 4, it will be seen that the diaphragm 20 is lifted from its seated position upon the valve body 11 while the valve piston 48 remains positioned within the bore 15. The elevation of the valve stem 12 and the diaphragm 20 will move the piston 48 partially from the bore of the bushing 43 to partially expose the ports 45. Fluid flow may thus occur from the bore 15, and the bore of the bushing 43, through the ports 45 into the discharge chamber 44 and then into the cup 17 and the nipple 55, with the ports 45 serving as variable orifices of a size determined by the setting of the valve stem 12, and more particularly by the position of the piston 48 within the bore of the bushing 43.

Very delicate adjustment of flow through the discharge chamber 44 is possible due to the tapering design of the apertures 45, permitting gradually increasing flow with relative elevation of the piston 48, and by the fact that the piston 48 must be removed completely from the bore of the bushing 43 before full flow through the valve body bore 15 can occur.

In the modified form of the invention illustrated in Figures 6 and 7, reference numerals identical with those of the modification of Figures 1–5 refer to identical portions of the valve. It will be seen that, in the modified form of the apparatus, the piston 48 has been modified by the provision of a beveled or flattened side face 60 which slopes downwardly and inwardly toward the bottom of the piston, and the bushing 43 is merely cylindrical in contour and is not provided with the discharge ports 45 nor the annular by-pass chamber 44.

The operation of the modification of Figures 6 and 7 is substantially the same as that hereinbefore described with the beveled side 60 of the piston providing increased fluid flow from the bore 15 during its removal from the bore. The flow characteristics of the valve illustrated in Figures 6 and 7 are thus quite similar to that of the embodiment of Figures 1–5 inclusive, with the valve accommodating large capacity flow while permitting the accurate metering of fluid about the piston. In addition, the simplified valve and bushing of Figures 6 and 7 is considerably cheaper to manufacture than the valve of the first described embodiment.

The advantages residing in the present invention will be evident to those skilled in the art and include the accurate metering of fluid flow through the valve by movement of the control cable 34 throughout the entire range of flow of the valve. In addition, at the flow shut off position of Figure 2, flow through the bore 15 is prevented both by the diaphragm 20 overlying the chamber 44 and the bore of the bushing 43, and by the piston 48 closing the bore of the bushing 43 and each of the discharge ports 45. Only one moving metal part, namely the piston 48, is exposed to fluid flowing through the valve 10, and the ease of maintenance of the valve will be appreciated. Further, the piston valve 48 and the washer 52 rigidly support the central portion 51 of the diaphragm 20 interposed therebetween and insure movement of the diaphragm 20 with the valve stem 12.

The improved control of heat output from an automotive-type hot air heater in which a valve of the present invention is employed to regulate the flow of water for heating air discharged from the heater will be appreciated by those skilled in the art, as will the accurate correlation of heat output of the heater with slight changes in atmospheric temperature.

It will be understood that modifications and variations may be effected without departing from the scope of the novel concepts of the present invention.

I claim as my invention:

1. A valve comprising a valve body having an axial bore adapted for the flow of fluid therethrough, discharge means adjacent one end of said body for receiving fluid flow from the discharge end of said bore, a cup surrounding said one end of the body, a bonnet on the cup, a stem guide on the bonnet, a stem slidable in the guide, a diaphragm clamped between the cup and bonnet, a piston secured to the stem projecting from the diaphragm and guided thereby axially of said bore into and out of telescoping relation therewith to control fluid flow therefrom, cooperating means on said piston and said body defining a varying discharge opening upon movement of said piston in said bore, and combined actuating and detent means connected to said stem for maintaining said piston in an adjusted metering position.

2. A valve comprising a tubular body having an axial passage therethrough with a counterbore in one end thereof, an external thread on the other end thereof, and an external shoulder spaced from the counterbored end, a cup having an apertured bottom seated on said shoulder and a side wall surrounding the counterbored end of the body, a collar surrounding said body inside of said cup and bottomed on the apertured bottom of the cup to hold the cup against said shoulder, a discharge tube secured in the side wall of the cup, said cup providing a discharge chamber surrounding the counterbored end of the body and communicating with said tube, a bonnet affixed to the open end of the cup, a flexible diaphragm clamped between the cup and bonnet, a stem guide on said bonnet spaced from the diaphragm, a stem slidable in said guide having an outturned flange portion overlying the central portion of the diaphragm and a threaded bore in the flanged end of the stem, a piston comprising a shank projecting through said diaphragm and threaded into said bore of the stem and a head underlying the diaphragm to cooperate with the flanged end of the stem for sealingly clamping the diaphragm therebetween, a bushing seated in said counterbore sized for slidably receiving the piston to control flow through the body into the cup, and means on said bonnet for actuating said stem to shift the diaphragm from a valve closing position against the counterbored end of the body with the piston seated in the bushing and a fully opened position with the diaphragm and piston spaced from the body while the stem guide holds the piston in alignment with the body for reinsertion in the bushing, and said piston and bushing having coacting sides for metering flow from the body to the cup when the diaphragm is moved off the body and before the piston is moved out of the bushing.

3. A valve comprising a tubular body having an axial passage therethrough, an external thread on one end thereof, and an external shoulder on the other end thereof, a cup having an apertured bottom seated on said shoulder and a side wall surrounding the other end of the body, a collar surrounding said body inside of said cup and bottomed on the apertured bottom of the cup to hold the cup against said shoulder, a discharge tube secured in the side wall of the cup, said cup providing a discharge chamber surrounding the said other end of the body and communicating with said tube, a bonnet affixed to the open end of the cup, a flexible diaphragm clamped between the cup and bonnet, a stem guide on said bonnet spaced from the diaphragm, a stem slidable in said guide having an outturned flange portion overlying the central portion of the diaphragm, a threaded bore in the flanged end of the stem, a piston comprising a shank projecting through said diaphragm and threaded into said bore of the stem and a head underlying the diaphragm to cooperate with the flanged end of the stem for sealingly clamping the diaphragm therebetween, said piston being slidable within said axial passage, and means on said bonnet for actuating said stem to shift the diaphragm from a valve closing position against the said other end of the body with the piston seated in said passage and a fully open position with the diaphragm and piston spaced from the body while the stem guide holds the piston in alignment with the body for reinsertion in the passage, and said piston and said passage having coacting sides for metering flow from the body to the cup when the diaphragm is moved off the body and before the piston is moved out of the passage.

4. A valve constructed according to claim 1 wherein said piston has a substantially cylindrical peripherial wall and the discharge end of said bore has a tapered notch therein for cooperation with said peripherial wall to provide an adjustable metering orifice.

5. A valve constructed according to claim 1 wherein said discharge end of said bore has a tapered notch therein for cooperation with said piston to provide an adjustable metering orifice.

6. A valve constructed in accordance with claim 1 wherein said cooperating means on said piston and said body defining a varying discharge opening comprises at least one tapered notch in said body for cooperation with said piston to provide an adjustable metering orifice.

7. A valve constructed according to the provisions of claim 1 wherein said cooperating means on said piston and said body comprises a tapered recess in said piston cooperating with a circular periphery at the discharge end of said bore to provide an adjustable metering orifice to control fluid flow.

RUSSELL R. CURTIS.

References Cited in the file of this patent

UNITED STATES PATENTS

| Number | Name | Date |
| --- | --- | --- |
| 318,748 | Kays | May 26, 1885 |
| 365,767 | Zilles | June 28, 1887 |
| 1,182,030 | O'Dowd | May 9, 1916 |
| 1,358,968 | Mattern | Nov. 16, 1920 |
| 1,385,058 | Warter | July 19, 1921 |
| 1,626,289 | Langdon | Apr. 26, 1927 |
| 2,186,024 | Iler | Jan. 9, 1940 |
| 2,228,552 | Abrogast | Jan. 14, 1941 |
| 2,333,775 | Gille | Nov. 9, 1943 |
| 2,386,051 | Kempton | Oct. 2, 1945 |
| 2,387,792 | Holmes | Oct. 30, 1945 |
| 2,516,825 | Kejduk | July 25, 1950 |

FOREIGN PATENTS

| Number | Country | Date |
| --- | --- | --- |
| 328,204 | Great Britain | of 1930 |
| 337,569 | Great Britain | of 1930 |
| 420,021 | Germany | of 1925 |